(12) United States Patent
Zhu (10) Patent No.: US 8,961,214 B2
(45) Date of Patent: Feb. 24, 2015

(54) CONNECTING DEVICE AND COMBINATION OF THE SAME AND EXPANSION CARD

(71) Applicant: Wistron Corporation, New Taipei (TW)

(72) Inventor: Chong-Xing Zhu, New Taipei (TW)

(73) Assignee: Wistron Corporation, New Taipei (TW)

( * ) Notice: Subject to any disclaimer, the term of this patent is extended or adjusted under 35 U.S.C. 154(b) by 24 days.

(21) Appl. No.: 14/036,218

(22) Filed: Sep. 25, 2013

(65) Prior Publication Data

US 2014/0106595 A1 Apr. 17, 2014

(30) Foreign Application Priority Data

Oct. 12, 2012 (CN) .................... 2012 2 0525324 U (51) Int. Cl.
*H01R 13/62* (2006.01)
*G06F 1/18* (2006.01)

(52) U.S. Cl.
CPC .............. *H01R 13/62* (2013.01); *G06F 1/186* (2013.01)
USPC .......................................... 439/345

(58) Field of Classification Search
USPC ............ 439/345, 347, 638, 61; 361/756, 807, 361/752, 754, 803
See application file for complete search history.

(56) References Cited

U.S. PATENT DOCUMENTS

| | | | | |
|---|---|---|---|---|
| 5,594,621 A * | 1/1997 | van Rumpt | ............... | 361/679.32 |
| 5,598,318 A * | 1/1997 | Dewitt et al. | ............ | 361/679.57 |
| 6,105,090 A * | 8/2000 | Fosmo | ........................... | 710/302 |
| 6,216,184 B1 * | 4/2001 | Fackenthall et al. | .......... | 710/301 |
| 6,556,451 B1 * | 4/2003 | Feightner et al. | ............. | 361/756 |
| 6,618,260 B2 * | 9/2003 | Willis et al. | .................... | 361/752 |
| 7,075,797 B1 * | 7/2006 | Leonard et al. | ............... | 361/803 |
| 7,359,216 B2 * | 4/2008 | Hall | ............................. | 361/796 |
| 7,443,694 B1 * | 10/2008 | Chen et al. | .................... | 361/801 |
| 7,499,285 B2 * | 3/2009 | Chen et al. | .................... | 361/752 |
| 7,525,815 B2 * | 4/2009 | Chen et al. | .................... | 361/788 |
| 7,626,830 B2 * | 12/2009 | Fan et al. | ....................... | 361/801 |
| 7,742,291 B2 * | 6/2010 | Wu et al. | .................. | 361/679.32 |
| 7,746,630 B2 * | 6/2010 | Tsai et al. | ................ | 361/679.32 |
| 7,848,115 B2 * | 12/2010 | Casto et al. | .................... | 361/788 |
| 7,990,732 B2 * | 8/2011 | Kuo et al. | ..................... | 361/754 |

(Continued)

FOREIGN PATENT DOCUMENTS

TW M330494 4/2008
TW M419377 U1 12/2011

OTHER PUBLICATIONS

Translation of TW M330494.
Translation of TW M419377.

*Primary Examiner* — Alexander Gilman
(74) *Attorney, Agent, or Firm* — Whyte Hirschboeck Dudek S.C.

(57) ABSTRACT

A connecting device includes a riser bracket, a positioning mechanism and a riser card. The positioning mechanism has a plurality of standoffs and a latch disposed on the riser bracket. Each standoff has a head, a shoulder and a neck interconnecting the head and the shoulder. The latch is movable between a locking position for locking the riser card and a releasing position. The riser card is formed with a plurality of through holes corresponding in position to the standoffs. Each through hole has a large hole portion for extension of the head of a respective standoff and a small hole portion having an inner diameter that is equal to an outer diameter of the neck of the respective standoff.

16 Claims, 11 Drawing Sheets

(56) References Cited

U.S. PATENT DOCUMENTS

| | | | |
|---|---|---|---|
| 8,054,642 B2 * | 11/2011 | Liu et al. | 361/759 |
| 8,238,097 B2 * | 8/2012 | Chen et al. | 361/679.58 |
| 8,254,130 B2 * | 8/2012 | Fan et al. | 361/724 |
| 8,254,145 B2 * | 8/2012 | Hsieh et al. | 361/807 |
| 8,295,060 B2 * | 10/2012 | Liu et al. | 361/800 |
| 8,585,442 B2 * | 11/2013 | Tuma et al. | 439/638 |
| 2002/0072255 A1 * | 6/2002 | Leman | 439/61 |
| 2005/0122703 A1 * | 6/2005 | Fan et al. | 361/801 |
| 2006/0065721 A1 * | 3/2006 | Addison et al. | 235/383 |
| 2008/0183933 A1 * | 7/2008 | Peng et al. | 710/302 |

* cited by examiner

CONNECTING DEVICE AND COMBINATION OF THE SAME AND EXPANSION CARD

CROSS-REFERENCE TO RELATED APPLICATION

This application claims priority of Chinese Patent Application No. 2012205253243, filed on Oct. 12, 2012, the disclosure of which is incorporated herein by reference.

BACKGROUND OF THE INVENTION

1. Field of the Invention

The invention relates to a connecting device for being connected to an expansion card, and a combination of the connecting device and the expansion card.

2. Description of the Related Art

A casing of a common server is typically flat to facilitate stacking one on top of another, thereby reducing occupied space. However, this results in limitation of a space between the casing and a circuit board disposed inside the casing, such that a common expansion card cannot be vertically installed on the circuit board, and a riser card is needed for redirecting the expansion card so that the expansion card can be arranged parallel to the circuit board.

Figure 1:
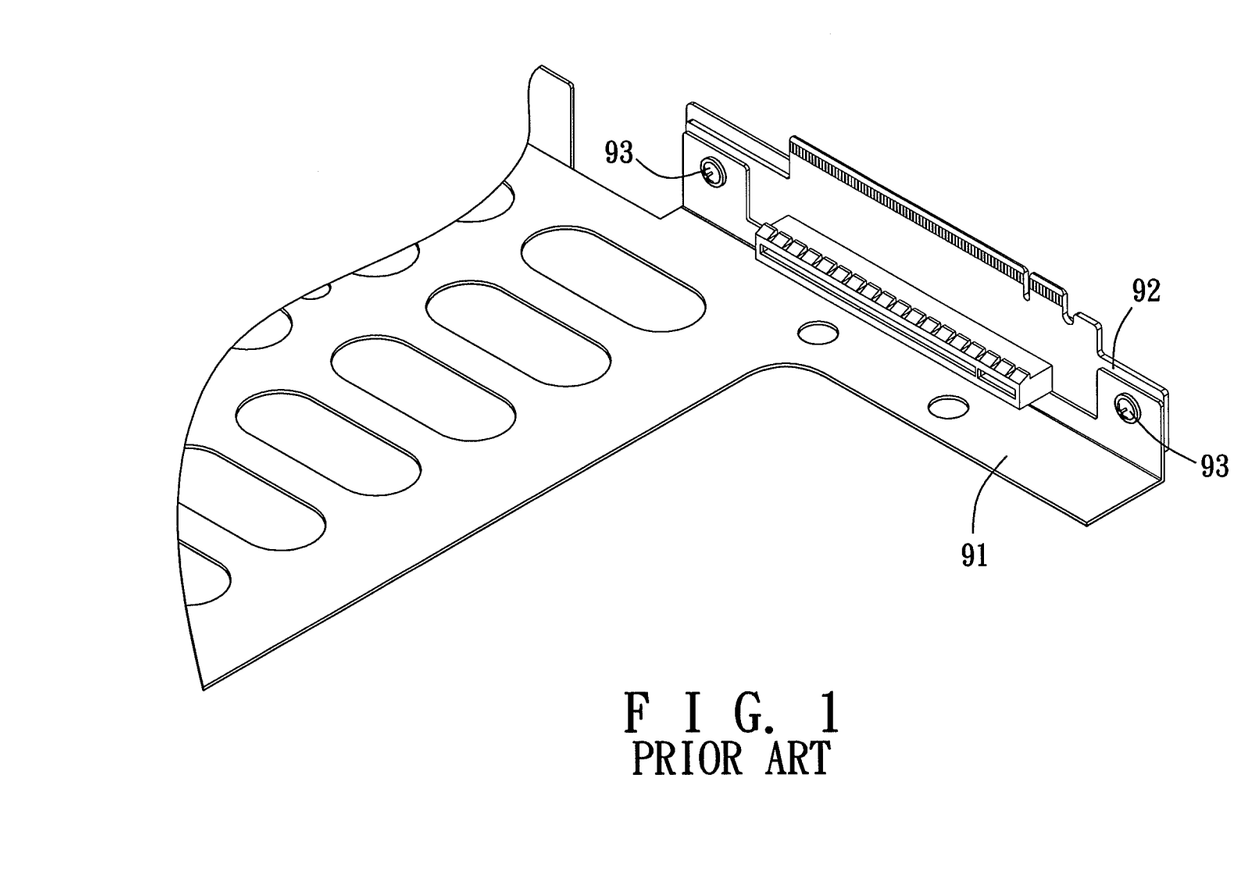
FIG. 1 is a fragmentary perspective view, illustrating a common riser card and a conventional riser bracket.

Referring to FIG. 1, for conveniently installing an expansion card (not shown), a riser bracket 91 is generally used to first fix a riser card 92 thereon. Then, the expansion card is connected to the riser card 92 and fixed on the riser bracket 91 to form an expansion card combination. Next, the expansion card combination is installed on a circuit board (not shown) of a server (not shown). However, the usual manner for fixing the riser card 92 on the riser bracket 91 requires a plurality of screws 93 for fastening the riser card 92 on the riser bracket 91, and the screws 93 need to be turned one by one with a tool when being tightened and loosened. This not only requires a relatively long working time, but may also adversely affect the fastening stability if the screws 93 are defective in quality.

SUMMARY OF THE INVENTION

Therefore, an object of the invention is to provide a connecting device which enables quick installation of a riser card without using a tool, and a combination comprising the connecting device and an expansion card.

According to this invention, the expansion card has a connecting side and a securing side that is connected to the connecting side. The connecting device includes a riser bracket, a positioning mechanism and a riser card. The riser bracket has a base wall, a first side wall that extends perpendicularly from the base wall and that corresponds in position to the connecting side of the expansion card, and a second side wall that extends perpendicularly from the base wall and that corresponds in position to the securing side of the expansion card. The base wall cooperates with the first side wall and the second side wall to define a receiving space for receiving the expansion card. The positioning mechanism has a plurality of standoffs and a latch disposed on the first side wall. Each of the standoffs protrudes into the receiving space and has a head, a shoulder, and a neck that interconnects the head and the shoulder. The latch is movable relative to the first side wall between a locking position and a releasing position. The riser card includes a card body and an electrical connector that is disposed on the card body and that is electrically connected to the expansion card. The card body has a plurality of through holes that are slidably and respectively engaged with the standoffs. Each of the through holes has a large hole portion for extension of the head of a respective one of the standoffs and a small hole portion that has an inner diameter being equal to an outer diameter of the neck of the respective one of the standoffs. The large hole portion and the small hole portion are arranged to be in communication with each other in a sliding direction. During assembling of the riser card, moving the riser card in the sliding direction after extension of the heads of the standoffs through the large hole portions of the through holes enables the necks of the standoffs to enter respectively the small hole portions of the through holes, so that a portion of the card body located around the small hole portions of each of the through holes is clamped between the head and the shoulder of a corresponding one of the standoffs, and moving the latch from the releasing position to the locking position prevents the riser card from moving reversely, thereby fixing the riser card.

The effect of the invention lies in that, by virtue of the cooperation between the positioning mechanism on the riser bracket and the card body of the riser card, the riser card may be quickly installed and detached without using a tool. In addition, no screw is required to secure the riser card, which prevents the risk of screw loosening, thereby reducing repair and maintenance costs.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 2:
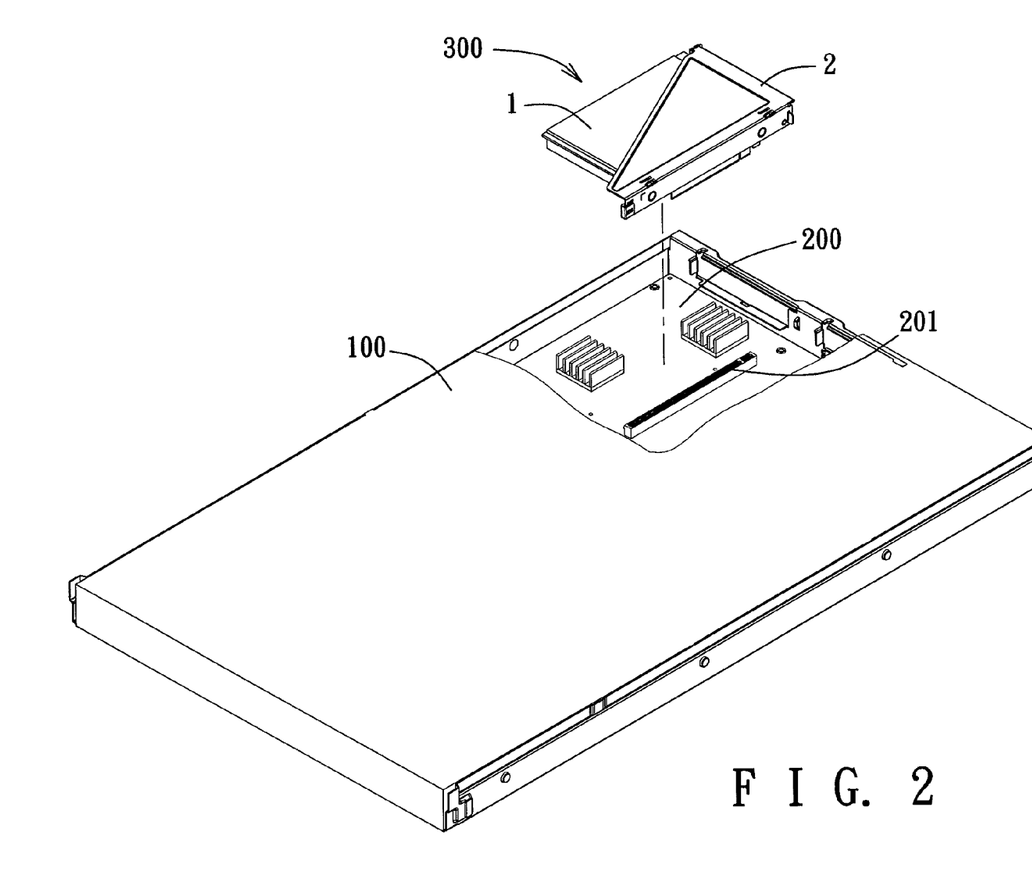
FIG. 2 is a partly cutaway exploded perspective view, illustrating a corresponding relationship between an embodiment of a combination of a connecting device and an expansion card according to the present invention and a circuit board.
Figure 3:
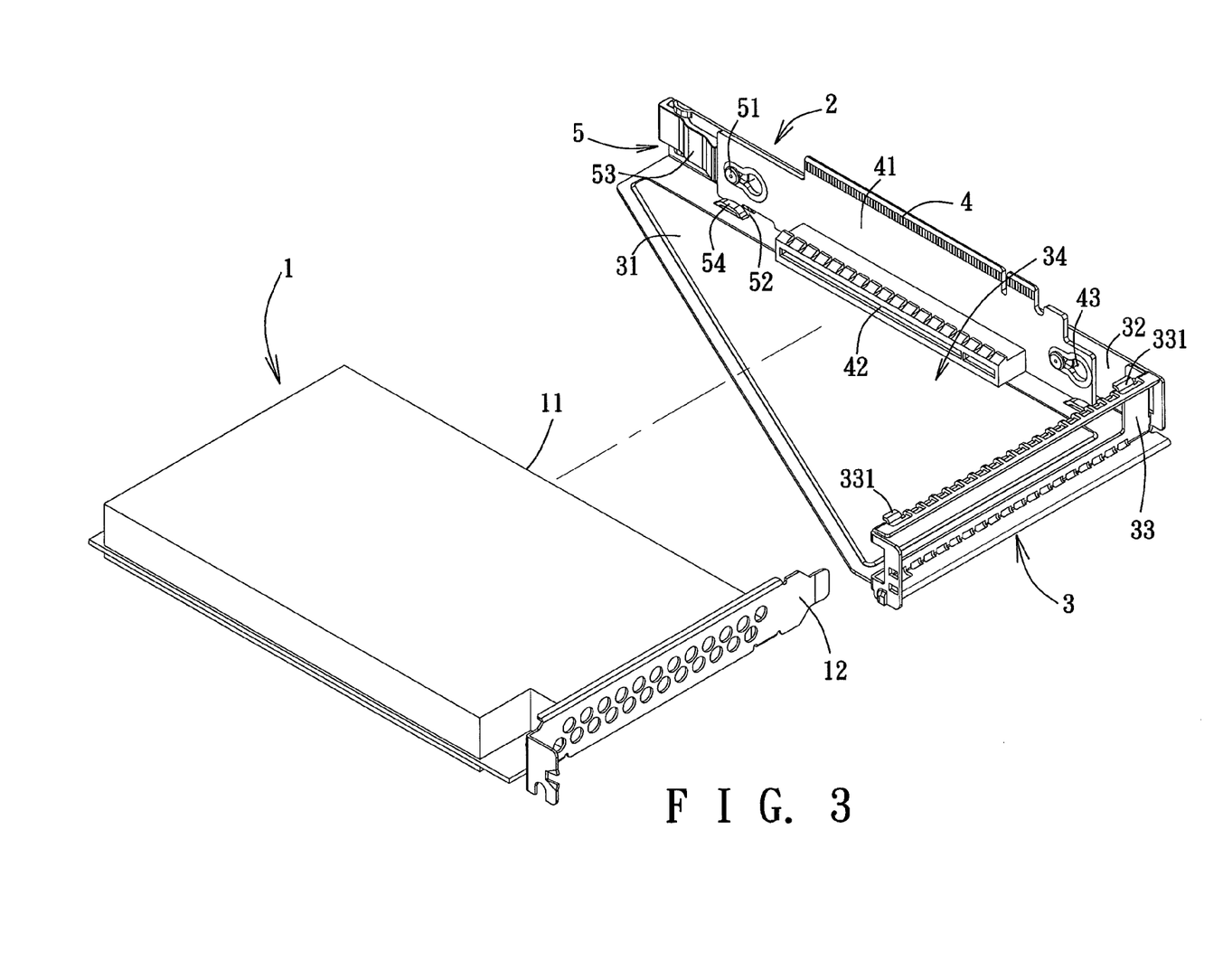
FIG. 3 is an exploded perspective view, illustrating the connecting device and the expansion card of the embodiment.

Referring to FIGS. 2 and 3, a combination 300 of a connecting device 2 and an expansion card 1 according to an embodiment of the invention is adapted to be installed on a circuit board 200 within an electronic device 100 such as a server. The circuit board 200 is disposed inside the electronic device 100 and is provided with a card connector 201. The expansion card 1 has a connecting side 11 and a securing side 12 connected to the connecting side 11. The connecting device 2 is connected to the expansion card 1 to enable the expansion card 1 to be electrically connected to the card connector 201.

Figure 4:
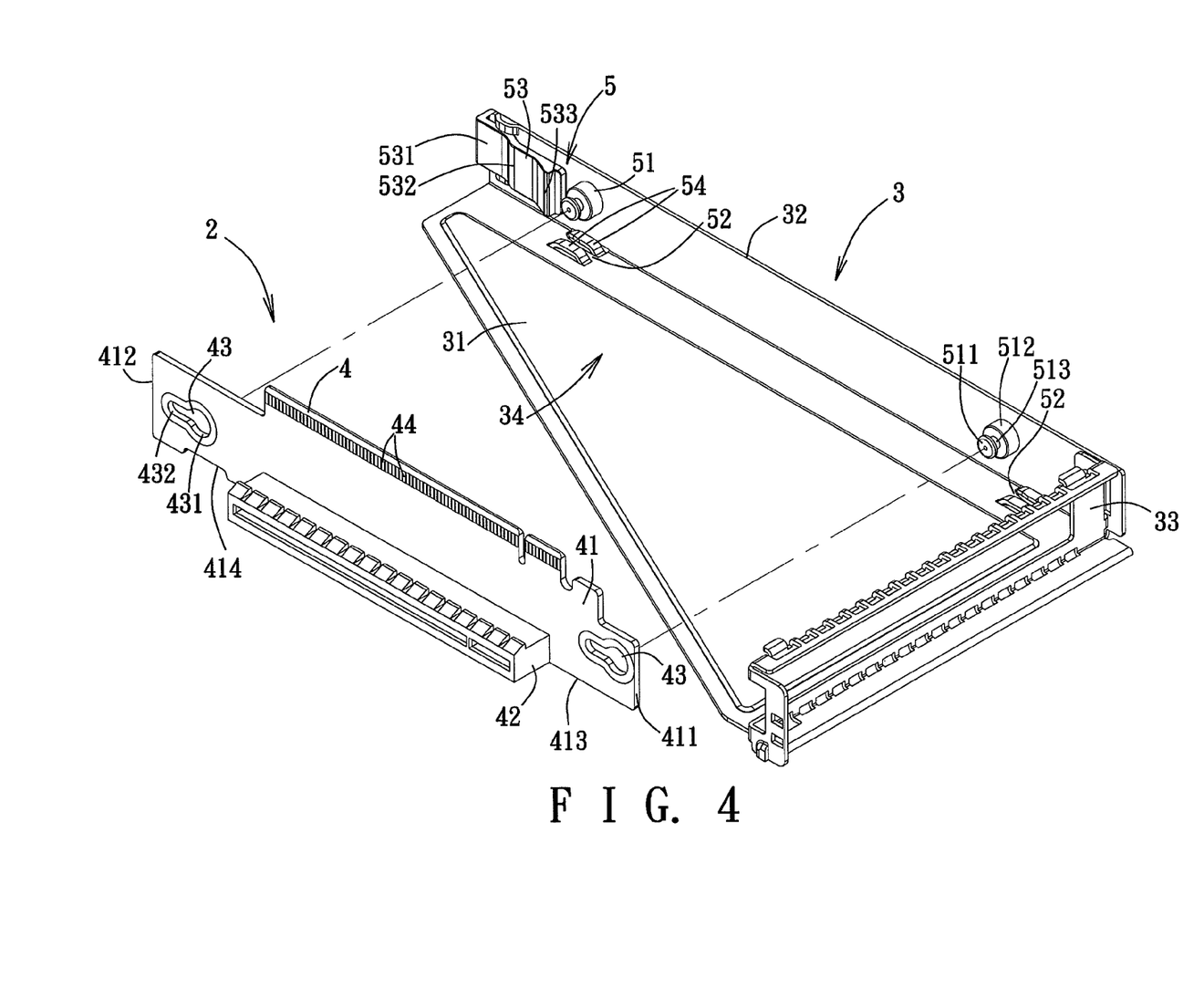
FIG. 4 is an exploded perspective view, illustrating a riser bracket and a riser card of the connecting device of the embodiment.

Referring to FIGS. 3 and 4, the connecting device 2 includes a riser bracket 3, a positioning mechanism 5 and a riser card 4. The riser bracket 3 has a base wall 31, a first side wall 32 extending perpendicularly from the base wall 31 and corresponding in position to the connecting side 11 of the expansion card 1, and a second side wall 33 extending perpendicularly from the base wall 31 and corresponding in position to the securing side 12 of the expansion card 1. The base wall 31, the first side wall 32 and the second side wall 33 cooperatively define a receiving space 34 for receiving the expansion card 1.

Figure 5:
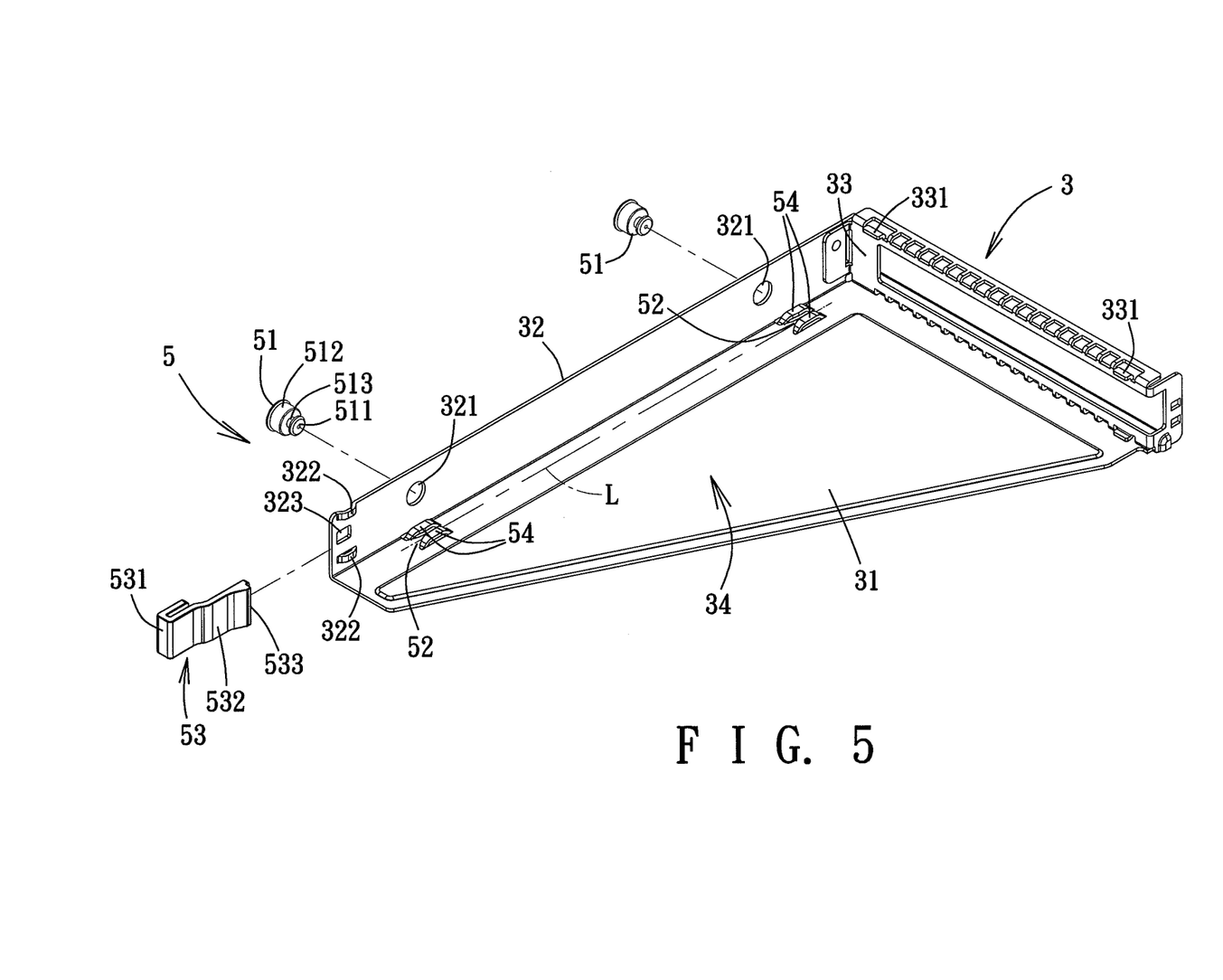
FIG. 5 is an exploded perspective view, illustrating the riser bracket and a positioning mechanism of the connecting device of the embodiment.
Figure 6:
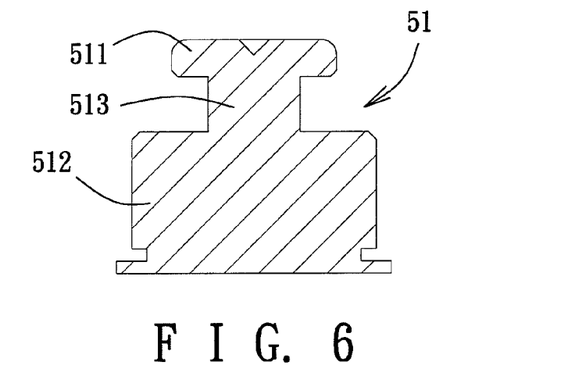
FIG. 6 is a sectional view, illustrating a standoff of the positioning mechanism of the embodiment.

Referring to FIGS. 4 to 6, the positioning mechanism 5 has a plurality of standoffs 51, two slide grooves 52 and a latch 53. The standoffs 51 are disposed on the first side wall 32 and protrude into the receiving space 34. Each of the standoffs 51 has a head 511 in a shape of a circular plate, a shoulder 512 in a shape of a column and a neck 513 interconnecting the head 511 and the shoulder 512. The outer diameter of the head 511 is smaller than that of the shoulder 512, and the outer diameter of the neck 513 is smaller than that of the head 511. In this embodiment, the positioning mechanism 5 includes two of the standoffs 51, which are individually formed and mounted on the first side wall 32. The first side wall 32 has two engaging holes 321 for extension of the standoffs 51, respectively. Each of the standoffs 51 has a groove at a distal end of the shoulder 512 and engaged with the first side wall 32 for securing the one of the standoffs 51 to the first side wall 32.

Figure 12:
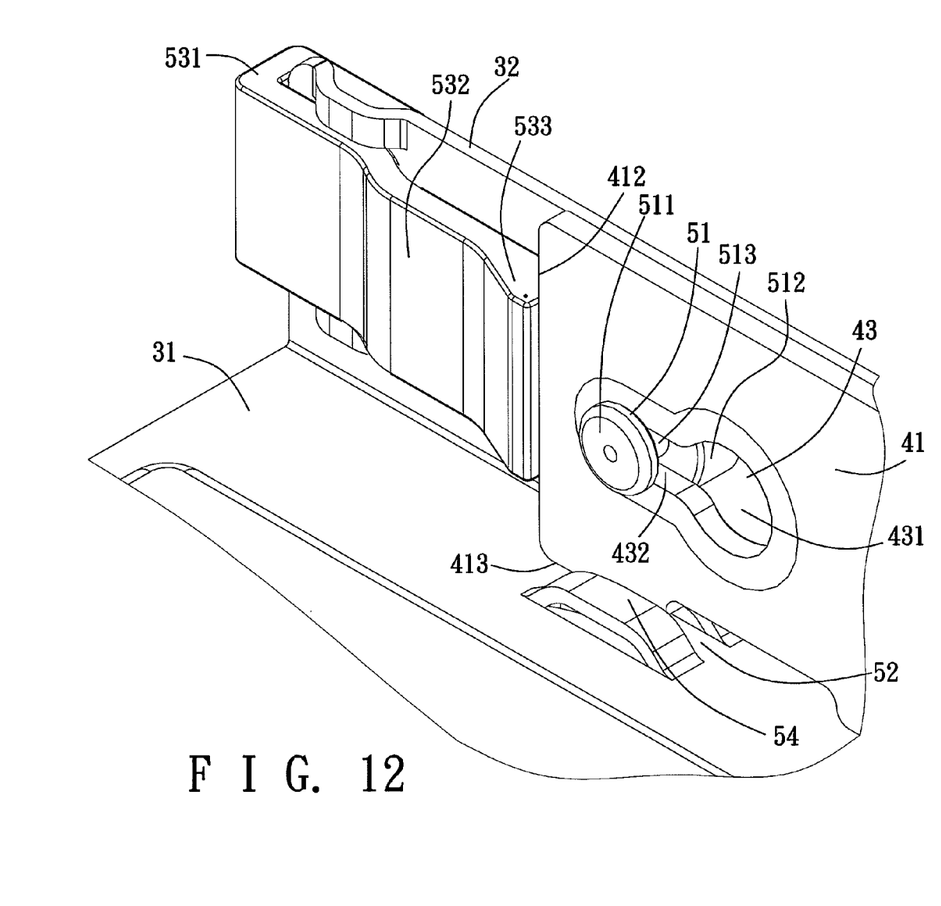
FIG. 12 is an enlarged fragmentary perspective view of FIG. 11.

The slide grooves 52 are disposed on the base wall 31 of the riser bracket 3 along an axis (L) parallel to the first side wall 32 and are spaced apart from each other. Each slide groove 52 is defined by a pair of protruding portions 54 of the base wall 31 that are formed by stamping. The latch 53 is disposed at an end of the first side wall 32 of the riser bracket 3 distal from the second side wall 33. In this embodiment, the latch 53 is a spring plate having a securing portion 531 that is fixed at the end of the first side wall 32 distal from the second side wall 33, a resilient portion 532 that extends from the securing portion 531 towards the second side wall 33, and a stop portion 533 that extends from the resilient portion 532 towards the receiving space 34. The latch 53 is movable relative to the first side wall 32 between a locking position (see FIG. 12) and a releasing position (see FIG. 10). Specifically, when the resilient portion 532 does not have an elastic displacement, the latch 53 is located at the locking position. When the stop portion 533 is moved by a force toward the first side wall 31 to cause a resilient displacement of the resilient portion 532, the latch 53 is moved to the releasing position.

Figure 7:
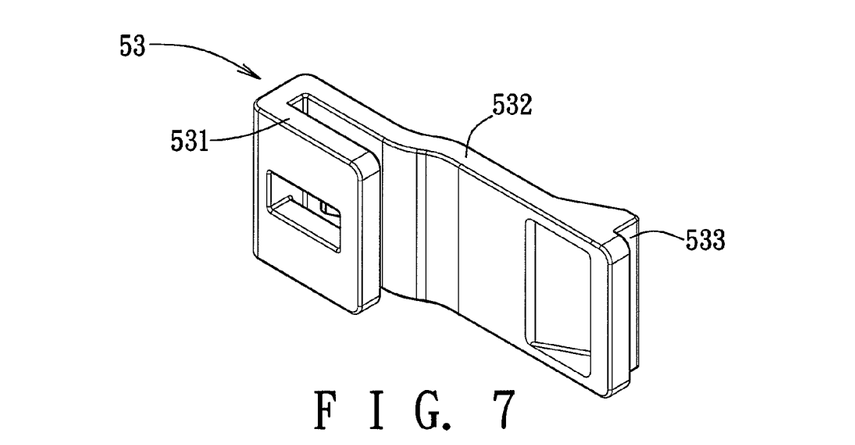
FIG. 7 is a perspective view, illustrating a latch of the positioning mechanism of the embodiment.
Figure 8:
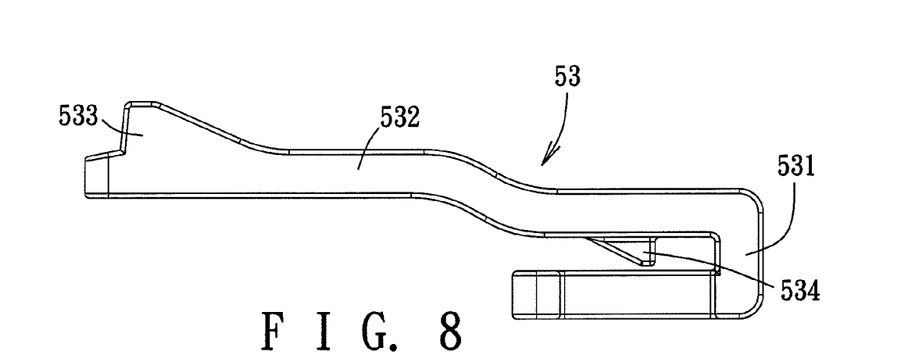
FIG. 8 is a top view, illustrating the latch of the embodiment.

Referring to FIGS. 4, 7 and 8, in this embodiment, the latch 53 is individually made before being installed on the first side wall 32. The securing portion 531 is U-shaped, is clipped on the first side wall 32, and has a wedge-shaped coupling block 534 protruding inwardly. The stop portion 533 is a stepped portion for abutting against an edge of the riser card 4 when the latch 53 is at the locking position.

The first side wall 32 further has a pair of positioning ribs 322 spaced apart from each other and clamping the securing portion 531 therebetween, and a coupling hole 323 located between the positioning ribs 322 to engage the coupling block 534, thereby fixing the latch 53 on the first side wall 32 and preventing the latch 53 from sliding and rotating.

Referring to FIGS. 4 and 9 to 12, the riser card 4 includes a card body 41 and an electrical connector 42 disposed on the card body 41 and adapted to be electrically connected to the expansion card 1 (see FIGS. 2 and 3). The card body 41 is elongated, and has a first end edge 411 close to the second side wall 33, a second end edge 412 opposite to the first end edge 411, a longitudinal edge 413 abutting against the base wall 31, a plurality of through holes 43, and a plurality of terminals 44. The through holes 43 correspond respectively in position to the standoffs 51, and each of the through holes 43 has a large hole portion 431 for extension of the head 511 of a respective one of the standoffs 51, and a small hole portion 432 that has an inner diameter being equal to an outer diameter of the neck 513 of the respective one of the standoffs 51. The small hole portion 432 and the large hole portion 431 are arranged to be in communication with each other along a sliding direction (I) perpendicular to the second side wall 33. In this embodiment, the card body 41 has two of the through holes 43 which are close to the first end edge 411 and the second end edge 412, respectively. The large hole portions 431 of the through holes 43 are closer to the first end edge 411 than the corresponding small hole portions 432. An inner diameter of the large hole portions 431 is smaller than the outer diameter of the shoulders 512 of the standoffs 51. The longitudinal edge 413 of the card body 41 has a recess 414 that is close to the second end edge 412 and that has a dimension matching with the protruding portions 54 that define one of the slide grooves 52 close to the second end edge 412. The latch 53 is adjacent to the second end edge 412 of the card body 41. The terminals 44 are disposed on the side opposite to the longitudinal edge 413, are electrically connected to the electrical connector 42, and are inserted into and connected electrically to the card connector 201 (see FIG. 2).

Figure 9:
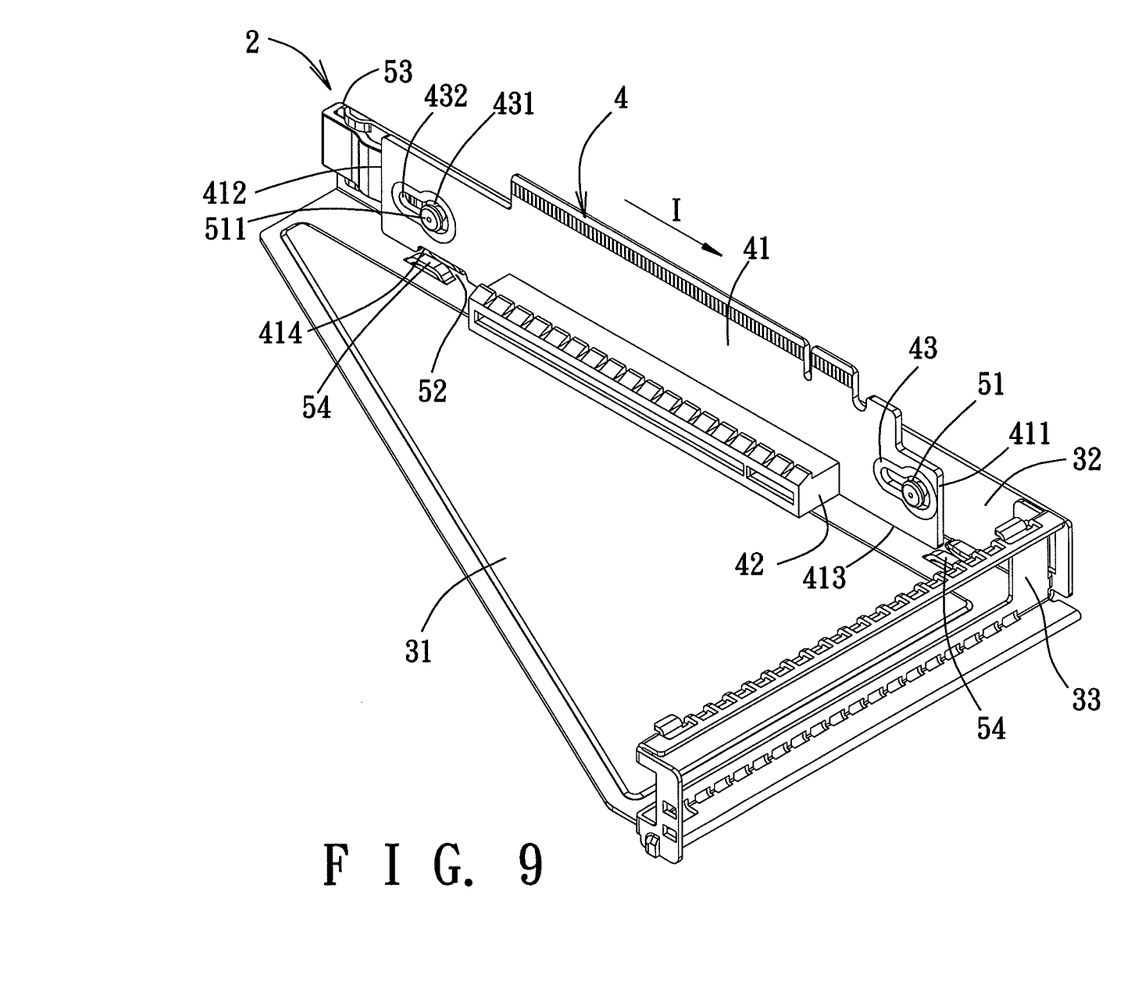
FIG. 9 is a perspective view, illustrating the riser card installed on the riser bracket and the latch located at a releasing position.
Figure 10:
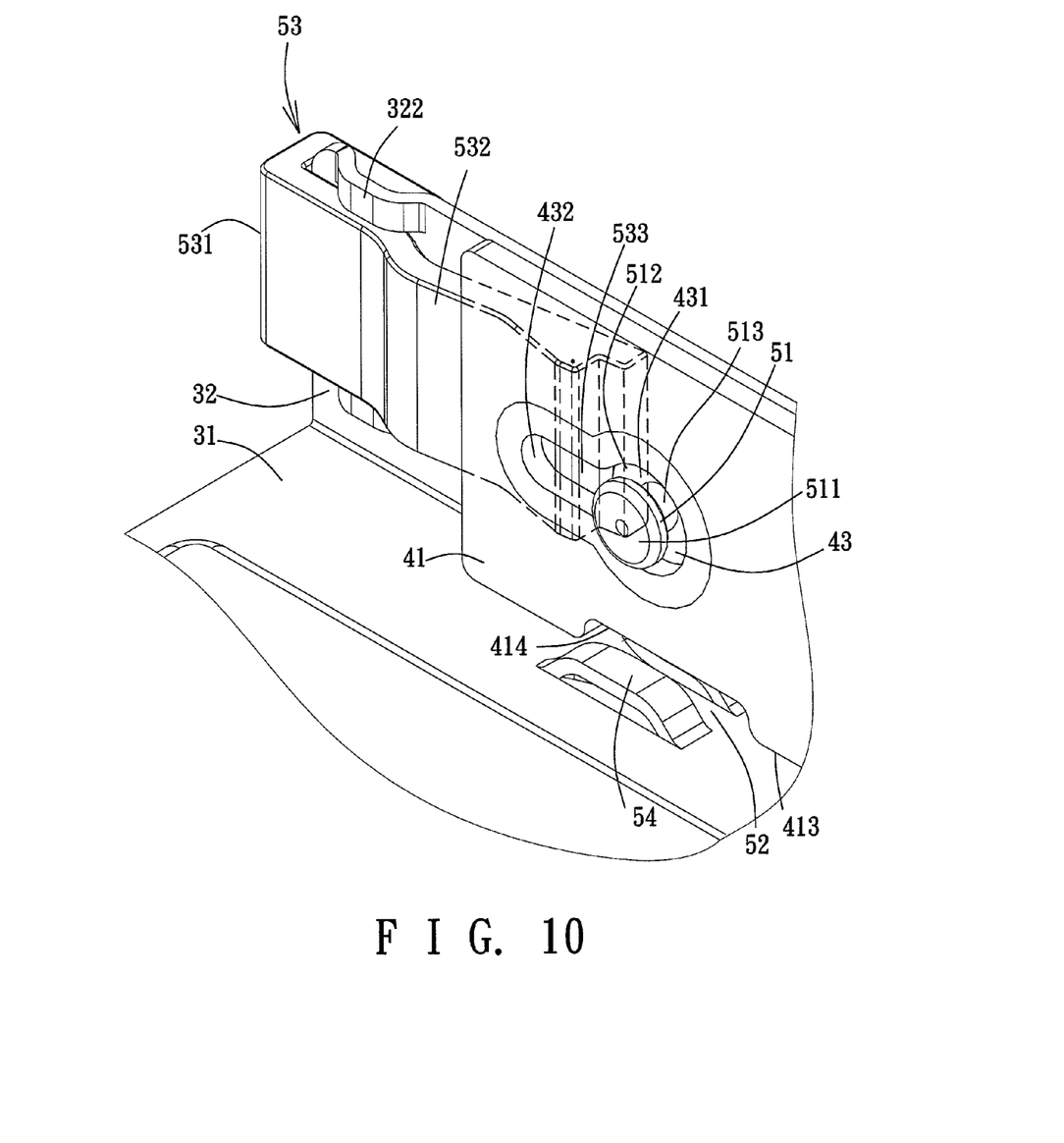
FIG. 10 is an enlarged fragmentary perspective view of FIG. 9.
Figure 11:
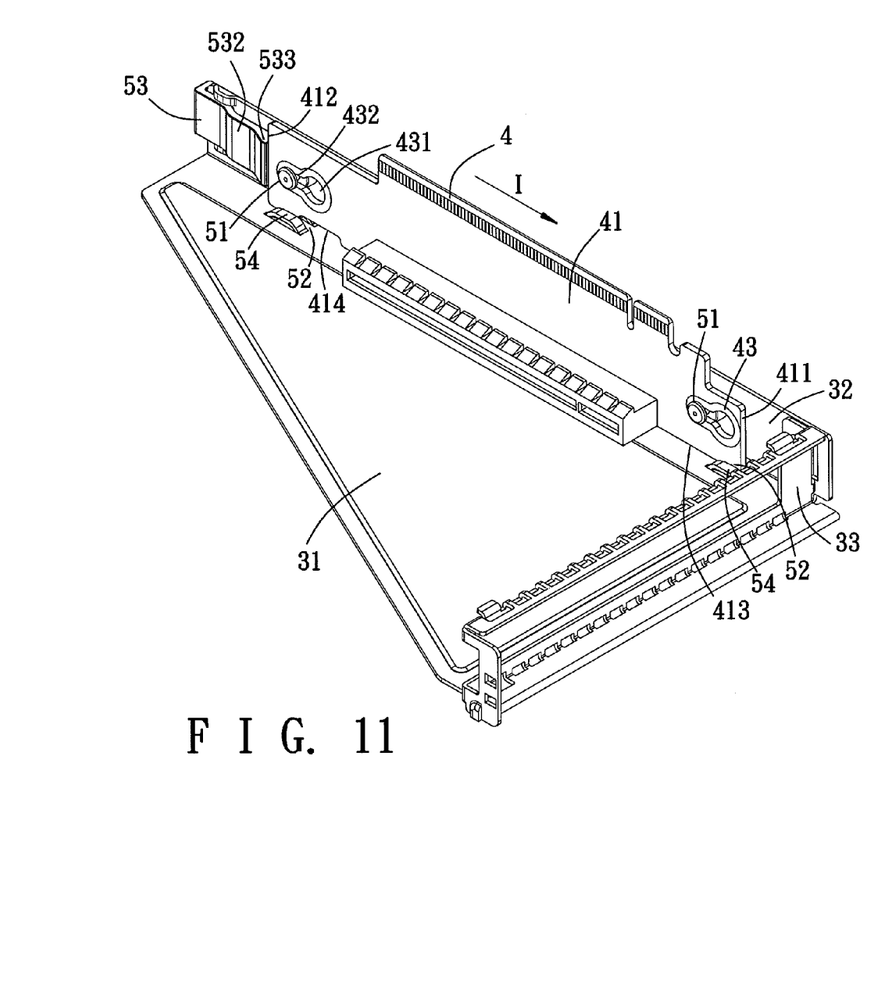
FIG. 11 is a perspective view, illustrating the riser card installed on the riser bracket and the latch located at a locking position.

As shown in FIGS. 4, 9 and 10, when installing the riser card 4 on the riser bracket 3, the card body 41 is first aligned with the standoffs 51 with the large hole portions 431 of the through holes 43 being aligned respectively with the heads 511 of the standoffs 51. Afterward, the card body 41 is moved toward the first side wall 32, so that the heads 511 of the standoffs 51 pass respectively through the corresponding large hole portions 431 to place the necks 513 within the large hole portions 431. Meanwhile, the card body 41 presses against the stop portion 533 of the latch 53 to cause the resilient portion 532 to have an elastic displacement. Because the inner diameter of the large hole portions 431 is smaller than the outer diameter of the shoulders 512 of the corresponding standoffs 51, the card body 41 would abut against the shoulders 512 of the standoffs 51. During the movement of the card body 41 toward the first side wall 32, the card body 41 is able to pass over the pair of the protruding portions 54 that define one of the slide grooves 52 close to the second end edge 412 by virtue of the recess 414. In addition, the card body 41 is configured that the longitudinal edge 413 would not pass over another pair of the protruding portions 54 that define the other one of the slide grooves 52 close to the second side wall 33 when the card body 41 is moved toward the first side wall 32.

As shown in FIGS. 9, 11, 12 and 13, the riser card 4 is then moved in the sliding direction (I) to enable the necks 513 of the standoffs 51 to respectively enter the small hole portions 432 from the large hole portions 431 of the through holes 43, so that a portion of the card body 41 located around the small hole portions 432 of each of the through holes 43 is clamped between the head 511 and the shoulder 512 of a corresponding one of the standoffs 51, and the latch 53 is moved to the locking position to stop the riser card 4 and prevent the riser card 4 from moving reversely. In particular, when assembling the riser card 4, the card body 41 of the riser card 4 is moved in the sliding direction (I) toward the second side wall 33, which causes the through holes 43 to have a displacement towards the second side wall 33 relative to the standoffs 51, so that the necks 513 of the standoffs 51 enter respectively the small hole portions 432 from the large hole portions 431 of the through holes 43. At the same time, the longitudinal edge 413 of the card body 41 passes through the two slide grooves 52 and is clamped between each pair of the protruding portions 54. In addition, the resilient portion 532 and the stop portion 533 of the latch 53 are released due to the movement of the card body 41 toward the second side wall 33, so that the latch 53 is automatically turned to the locking position by an action of the resilient restoring force, and that the stop portion 533 abuts against the second end edge 412 of the card body 41. Being stopped by the standoffs 51, the card body 41 cannot move towards the second side wall 33 any further. Being additionally stopped by the latch 53, the card body 41 cannot move away from the second side wall 33. Since the longitudinal edge 413 of the card body 41 is clamped between the protruding portions 54, the card body 41 is fixed firmly on the riser bracket 3 and cannot move or rotate along a direction perpendicular to the base wall 31 and the first side wall 32.

Figure 13:
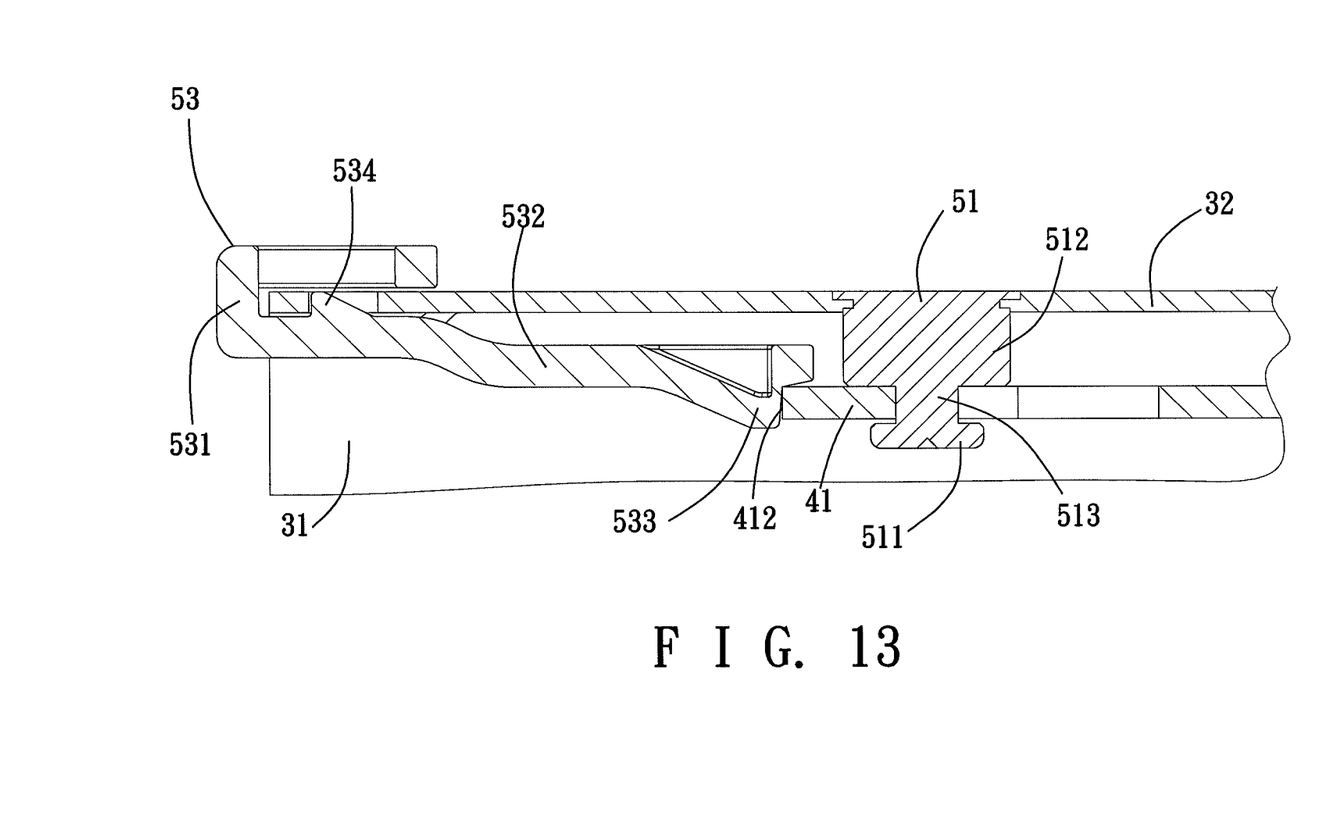
FIG. 13 is a fragmentary sectional view, illustrating the riser card installed on the riser bracket and the latch located at the locking position.

When detaching the riser card 4, the stop portion 533 of the latch 53 is pressed manually toward the first side wall 32 to the releasing position, where the stop portion 533 is moved toward the first side wall 32 and is separated from the second end edge 412 of the card body 41. Next, the card body 41 is moved in the direction opposite to the sliding direction (I), that is, the card body 41 is moved away from the second side wall 33. Consequently, the standoffs 51 are located respectively within the large hole portions 431 of the through holes 43. Then, the card body 41 is moved away from the first side wall 32 to be detached from the riser bracket 3. Thus, the riser card 4 can be quickly installed and detached without using a tool. Further, the risk of screw loosening can be avoided.

Referring back to FIGS. 2 and 3, after the riser card 4 is installed fixedly on the riser bracket 3, the expansion card 1 is moved toward the first side wall 32 with the securing side 12 of the expansion card 1 abutting against the second side wall 33 until the connecting side 11 of the expansion card 1 is connected electrically to the electrical connector 42. The second side wall 33 has a plurality of spaced-apart projecting pieces 331 (see FIG. 5) defining a rail for guiding the movement of the securing side 12. The combination 300 of the connecting device and the expansion card can then be installed on the circuit board 200, and be electrically connected to the circuit board 200 through the card connector 201.

To sum up, by virtue of the cooperation between the positioning mechanism 5 on the riser bracket 3 and the card body 41 of the riser card 4, the riser card 4 can be quickly installed and detached without using a tool. In addition, no screw is required during the assembling of the riser card 4, which prevents the risk of screw loosening, thereby reducing repair and maintenance costs.

While the invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A connecting device comprising:
a riser bracket having a first side wall;
a positioning mechanism having a plurality of standoffs and a latch that are disposed on said first side wall, each of said standoffs having a head, a shoulder, and a neck that interconnects said head and said shoulder, said latch being movable relative to said first side wall between a locking position and a releasing position; and
a riser card including a card body and an electrical connector that is disposed on said card body, said card body having a plurality of through holes that are slidably and respectively engaged with said standoffs, each of said through holes having a large hole portion for extension of said head of a respective one of said standoffs and a small hole portion that has an inner diameter being equal to an outer diameter of said neck of the respective one of said standoffs, said large hole portion and said small hole portion being arranged to be in communication with each other in a sliding direction;
wherein, during assembling of said riser card, moving said riser card in the sliding direction after extension of said heads of said standoffs through said large hole portions of said through holes enables said necks of said standoffs to enter respectively said small hole portions of said through holes, so that a portion of said card body located around said small hole portion of each of said through holes is clamped between said head and said shoulder of a corresponding one of said standoffs, and moving said latch from the releasing position to the locking position prevents said riser card from moving reversely, thereby fixing said riser card.

2. The connecting device of claim 1, wherein an outer diameter of said head of each of said standoffs is smaller than that of said shoulder of a corresponding one of said standoffs, and the outer diameter of said neck of each of said standoffs is smaller than that of said head of a corresponding one of said standoffs.

3. The connecting device of claim 1, wherein said riser bracket further has a base wall, said first side wall extending perpendicularly from said base wall, said card body of said riser card being elongated and having a first end edge, a second end edge that is opposite to said first end edge, and a longitudinal edge that abuts slidably against said base wall, said large hole portion of each of said through holes being closer to said first end edge than said small hole portion of a corresponding one of said through holes, said latch being adjacent to said second end edge of said card body.

4. The connecting device of claim 3, wherein said positioning mechanism further has two slide grooves disposed on said base wall along an axis that is parallel to said first side wall and spaced apart from each other for engaging said longitudinal edge of said card body.

5. The connecting device of claim 4, wherein each of said slide grooves is defined by a pair of protruding portions of said base wall.

6. The connecting device of claim 5, wherein said longitudinal edge of said card body has a recess that is close to said second end edge of said card body and that has a dimension matching with said protruding portions that define one of said slide grooves close to said second end edge.

7. The connecting device of claim 1, wherein said latch is a spring plate having a securing portion that is fixed to said first side wall, a resilient portion that extends from said securing portion, and a stop portion that extends from said resilient portion, said stop portion of said spring plate abutting against an edge of said card body when said latch is at the locking position, said resilient portion being exerted by a force and having a resilient displacement and said stop portion being moved closer to said first side wall and being separated from said card body when said latch is at the releasing position.

8. The connecting device of claim 7, wherein said securing portion of said latch is U-shaped, is clipped on said first side wall, and has a coupling block protruding inwardly, said first side wall having a pair of positioning ribs that are spaced apart from each other and that clamp said securing portion therebetween, and a coupling hole that is located between said positioning ribs and that is engaged with said coupling block.

9. A combination of a connecting device and an expansion card, comprising:
   an expansion card having a connecting side and a securing side that is connected to said connecting side; and
   a connecting device including
      a riser bracket that has a base wall, a first side wall that extends perpendicularly from said base wall and that corresponds in position to said connecting side of said expansion card, and a second side wall that extends perpendicularly from said base wall and that corresponds in position to said securing side of said expansion card, said base wall cooperating with said first side wall and said second side wall to define a receiving space for receiving said expansion card;
      a positioning mechanism that has a plurality of standoffs and a latch disposed on said first side wall, each of said standoffs protruding into said receiving space and having a head, a shoulder, and a neck that interconnects said head and said shoulder, said latch being movable relative to said first side wall between a locking position and a releasing position; and
   a riser card including a card body and an electrical connector that is disposed on said card body and that is electrically connected to said expansion card, said card body having a plurality of through holes that are slidably and respectively engaged with said standoffs, each of said through holes having a large hole portion for extension of said head of a respective one of said standoffs and a small hole portion that has an inner diameter being equal to an outer diameter of said neck of the respective one of said standoffs, said large hole portion and said small hole portion being arranged to be in communication with each other in a sliding direction, wherein, during assembling of said riser card, moving said riser card in the sliding direction after extension of said heads of said standoffs through said large hole portions of said through holes enables said necks of said standoffs to enter respectively said small hole portions of said through holes, so that a portion of said card body located around said small hole portion of each of said through holes is clamped between said head and said shoulder of a corresponding one of said standoffs, and moving said latch from the releasing position to the locking position prevents said riser card from moving reversely, thereby fixing said riser card.

10. The combination of the connecting device and the expansion card of claim 9, wherein an outer diameter of said head of each of said standoffs is smaller than that of said shoulder of a corresponding one of said standoffs, and the outer diameter of said neck of each of said standoff is smaller than that of said head of a corresponding one of said standoffs.

11. The combination of the connecting device and the expansion card of claim 9, wherein said card body of said riser card is elongated and has a first end edge, a second end edge opposite to said first end edge, and a longitudinal edge, said first end edge being close to said second side wall, said longitudinal edge abutting slidably against said base wall, said large hole portion of each of said through holes being closer to said first end edge than said small hole portion of a corresponding one of said through holes, the sliding direction being perpendicular to said second side wall, said latch being adjacent to said second end edge of said card body.

12. The combination of the connecting device and the expansion card of claim 11, wherein said positioning mechanism further has two slide grooves disposed on said base wall along an axis that is parallel to said first side wall and spaced apart from each other for engaging said longitudinal edge of said card body.

13. The combination of the connecting device and the expansion card of claim 12, wherein each of said slide grooves is defined by a pair of protruding portions of said base wall.

14. The combination of the connecting device and the expansion card of claim 13, wherein said longitudinal edge of said card body has a recess that is close to said second end edge of said card body and that has a dimension matching with said protruding portions that define one of said slide grooves close to said second end edge.

15. The combination of the connecting device and the expansion card of claim 11, wherein said latch is a spring plate having a securing portion that is fixed to an end of said first side wall distal from said second side wall, a resilient portion that extends from said securing portion towards said second side wall, and a stop portion that extends from said resilient portion towards said receiving space, said stop portion of said spring plate abutting against said second end edge of said card body when said latch is at the locking position, said resilient portion receiving a force and having a resilient displacement and said stop portion being moved closer to said first side wall and being separated from said card body when said latch is at the releasing position.

16. The combination of the connecting device and the expansion card of claim 15, wherein said securing portion of said latch is U-shaped, is clipped on said first side wall, and has a coupling block protruding inwardly, said first side wall having a pair of positioning ribs that are spaced apart from each other and that clamp said securing portion therebetween, and a coupling hole that is located between said positioning ribs and that is engaged with said coupling block.

* * * * *